Nov. 18, 1941.                C. D. GREENTREE                    2,263,295
                                VIBRATION METER
                    Filed June 27, 1941            2 Sheets-Sheet 1
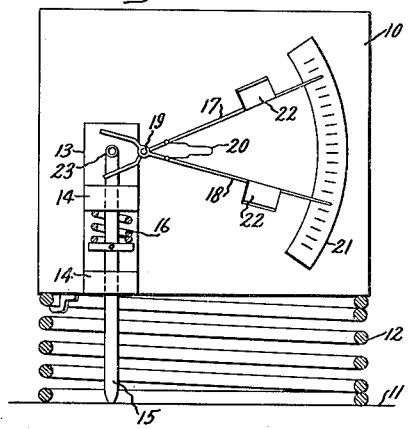
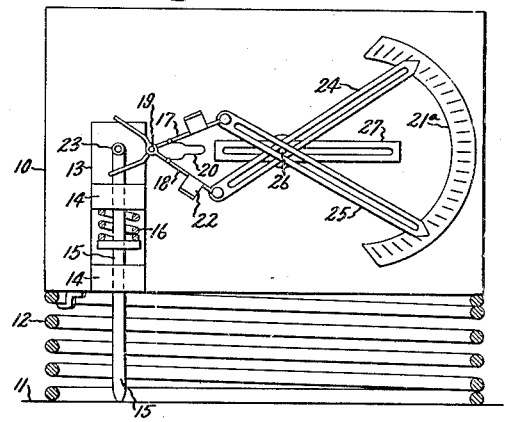
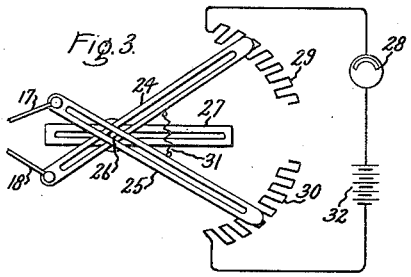
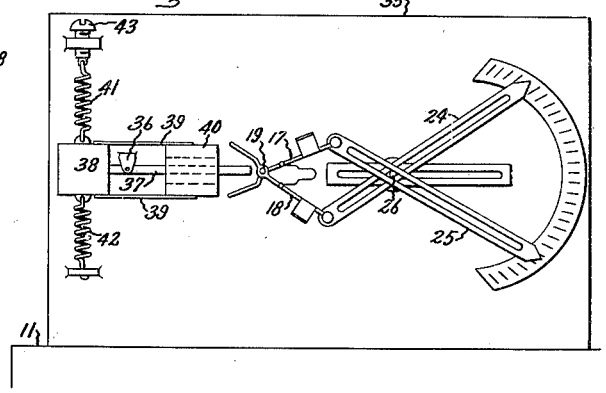
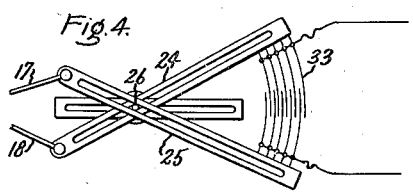
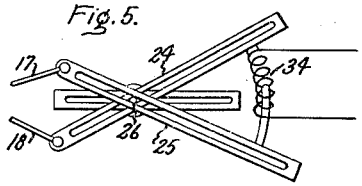
Inventor:
Charles D. Greentree,
by Harry E. Dunham
His Attorney Nov. 18, 1941.  C. D. GREENTREE  2,263,295
VIBRATION METER
Filed June 27, 1941  2 Sheets-Sheet 2
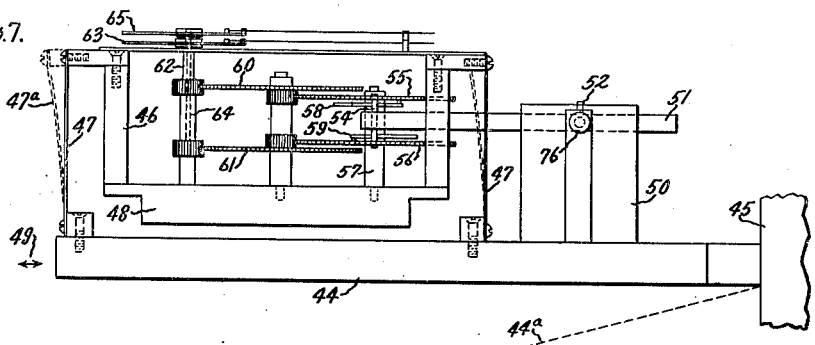
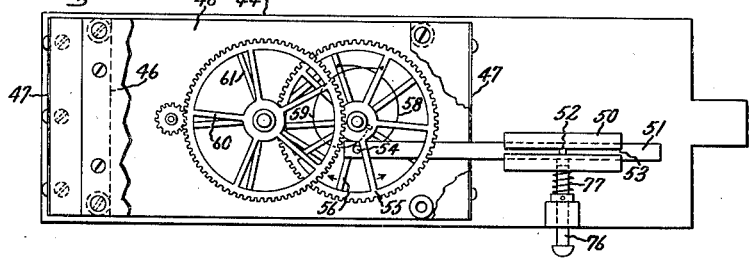
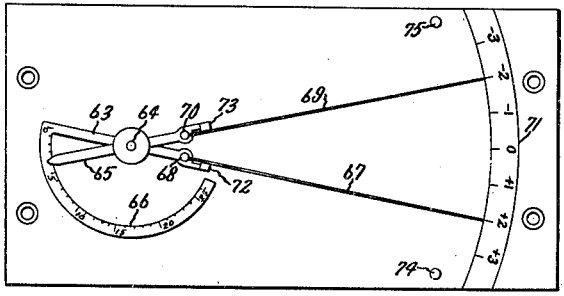
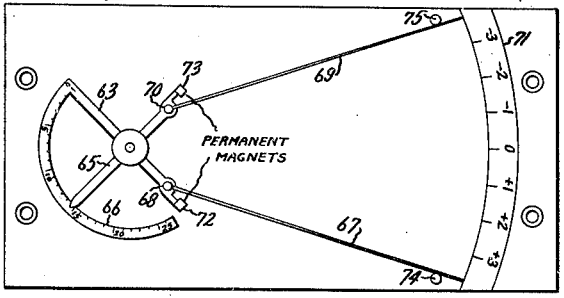
Inventor:
Charles D. Greentree,
by Harry E. Dunham
His Attorney.

Patented Nov. 18, 1941

2,263,295

UNITED STATES PATENT OFFICE 2,263,295

VIBRATION METER

Charles D. Greentree, Schenectady, N. Y., assignor to General Electric Company, a corporation of New York Application June 27, 1941, Serial No. 400,133

9 Claims. (Cl. 73—51)

My invention relates to mechanical vibration amplitude meters and its object is to provide such a meter in which the vibratory element thereof has small inertia which permits of large amplification and operating characteristics practically independent of the frequency of vibration over a wide range. Another object of my invention is to provide a relatively low cost portable meter of the type described, capable of use in a variety of positions.

The features of my invention which are believed to be novel and patentable will be pointed out in the claims appended hereto. For a better understanding of my invention reference is made in the following description to the accompanying drawings in which Fig. 1 shows a simple embodiment of my invention for measuring the amplitude of vibration and indicating the same after amplification; Fig. 2 shows a modification much like Fig. 1 but provided with means for adjusting the degree of amplification. Figs. 3, 4 and 5 show different means whereby the vibration amplitude measurement device may be employed as a telemeter transmitter. Fig. 6 shows a form of the invention which is designed so that its operation will be largely independent of the position in which it is held against the vibrating body under investigation; Figs. 7 and 8 are side and plan views of a preferred form of my invention where gearing is employed for amplifying the measurement. This form is also designed so that its operation is independent of the exact position in which it may be held on or with respect to the vibrating body under investigation; and Figs. 9 and 10 illustrate different indicating positions of a form of indicating mechanism that may be used with the vibration meter of Figs. 7 and 8.

Referring now to Fig. 1, 10 represents a block of metal or the like having considerable mass in comparison to the movable parts mounted thereon. 11 represents a body subject to vibration in a vertical direction, the amplitude of which vibration is to be measured. The block 10 is supported on body 11 by a spring 12 which spring may be fastened to the underside of block 10 so that the two will be movable as a unit for convenience. Secured to the side of block 10 is a member 13 having guides 14 for slidably supporting a light-weight rod 15, one end of which is resiliently held in contact with vibrating body 11 by a spring 16. The upper end of rod 15 is bent at right angles to project between the arms 17 and 18 of a lever amplifying and pointer system. The arms 17 and 18 are pivoted at 19 on the block 10 and are urged together by a light spring 20. The long ends of these arms indicate on a scale 21 and where desirable the arms may be provided with fan-like projections 22 for damping purposes.

The meter is shown in position to measure the amplitude of vertical vibration or vertical component of vibration of the member 11. If there is no vibration, the rod 15 is stationary and its length in relation to the resiliency of spring 12 and the weight of the meter thereon is such that the upper bent-over end 23 of the rod is centered between the short ends of arms 17 and 18 as shown when the long ends are symmetrical with respect to the scale 21. Also, under this condition spring 20 draws the arms together so that they both rest against part 23 of rod 15 and their indicating ends overlap and indicate on the center of scale 21. Assume now the member 11 is subject to vibration in a vertical direction. Owing to the inertia of block 10 and the resiliency of spring 12, the block 10 does not partake of the vibration of member 10 but stands still. The rod 15 may be made of aluminum tubing and is light in weight and is urged to remain in contact with vibrating member 11 by spring 16 and hence it vibrates with the vertical vibrations of member 11. Such vibration causes the rod to slide up and down in guides 14 at the rate and with the amplitude of vertical vibration to be investigated. Such vibration of rod 15 spreads the arms 17 and 18, the extent of such spreading being proportional to the amplitude of vibration. Now the arms 17 and 18 no longer rest in contact with part 23 of rod 15 since their inertia and damping and the weak restoring force of spring 20 are so proportioned that they can not move as fast as the rod 15. The short ends of arms 17 and 18 after being spread are merely lightly struck by part 23 of rod 15 at the extremities of its vibration and are held apart and hence indicate by their spread on scale 17 the amplitude of such vibration. In case the amplitude of vibration decreases, the arms 17 and 18 will be drawn together by a corresponding amount and hence follow closely changes in the amplitude of vibration but do not themselves partake of such vibration, except in a very minor degree and after the initial spreading action take little energy out of the vibrating rod 15. Hence the rod 15 is relatively free to accurately follow and measure the amplitude of the vibration over a wide range of frequency. It is important that all responsive elements in the meter be nonresonant. There is no resonant or natural vibration period phenomenon involved. The measurement is amplified by the lever arm ratio of arms 17 and 18, but this amplifying means remains relatively stationary and takes little energy from the vibrating amplitude measuring rod 15 and hence considerable amplification is possible using sufficiently rugged but lightweight amplifying means. This is a principle of all modifications of my meter to measure before and independently of amplification and this principle is important because then the amplifying means does not need to be vibrated and the amplification may be large.

In Fig. 2 I have shown double amplification where instead of using arms 17 and 18 as pointers they are used to spread a second set of levers 24 and 25 used as pointers with respect to scale 21a. Levers 24 and 25 are pivoted on a pin at 26 adjustable along a guide 27 secured on block 10. The levers 24 and 25 have central longitudinal slots in which pivot pin 26 is inserted. By adjusting pin 26 along guide 27 the extent of amplification may be changed to suit requirements.

In Fig. 3 I have shown how the mechanism of Fig. 2 may be used as a telemeter transmitter in order that the measurement as amplified may be indicated on a remote instrument 28. Adjacent to the scale position there is a resistance divided into two sections 29 and 30. Section 29 is arranged to be contacted by arm 24 and section 30 by arm 25. The two arms are electrical conductors and are electrically connected by a flexible connector 31. The two resistance sections are connected through the arms 24 and 25 in series with instrument 28 and a source of supply 32. By such arrangement the circuit is opened when the arms 24 and 25 are in a central position, which is the condition when there is no vibration amplitude measurement. Spreading of the arms first causes the circuit to be closed and then the circuit resistance to be progressively reduced. In Fig. 4 I have shown a condenser 33 which is varied by change in position of nonconducting indicator arms and in Fig. 5 a reactance 34 which is varied by change in spreading of such arms. Such variable impedance devices may be used for any of the usual control purposes.

It will be obvious that in the form of the invention shown in Figs. 1 and 2 that the relative positions of the contact rod 15 and the heavy block 10 must be the same in the idle condition for all measurements. That is, part 23 should be centered between the arms 17 and 18. If, for example, the meter was applied to a sloping surface instead of a horizontal surface 11 there would be a redistribution of the weight of the meter on the spring 12 and probably a movement of part 23 up or down from a central position. Its average oscillating position would also be off-center, which would throw the indication off-center and possibly off the scale entirely and in any event limit the amplitude of vibration that could be read on the available useful portion of the scale. The forms of the invention shown in Figs. 6 and 7 are intended to overcome this limitation and to be useful up to their maximum measurement ranges without requiring any special position or manner in which they are held in contact with the vibrating body.

In Fig. 6 the meter supporting structure or casing designated 35 need not be heavy and is preferably light in weight. It may be pressed or held against the vibrating surface 11 to be investigated by hand and vibrates with such surface. The amplifying and indicating system is like that of Fig. 2 and need not be further described. Pivoted at 36 to the casing support 35 is a stiff driving lever rod 37 having its long end centered between the short ends of levers 17 and 18 so as to drive them apart when oscillated about pivot 36. Rigidly fastened to the short end of rod 37 is a weight 38. Attached to weight 38 by flexible arms 39 is a second weight 40. The long arm of lever 37 extends freely through a central opening in weight 40 and does not contact such weight when oscillated. The weight 40 is of such size as to just counter-balance the weight 38 about pivot 36. Small adjusting springs 41 and 42 flexibly couple the weight 38 to the case 35 and the tension of these springs may be adjusted by screw 43 for the purpose of centering the driving end of rod 37 between the short ends of levers 17 and 18. Once this centering adjustment has been made, the rod 37 will stay centered in all positions of the meter since the assembly of weights 38 and 40 supported at pivot 36 is balanced on such pivot. Thus tipping the meter from the horizontal position shown does not disturb the centering adjustment. In use the meter is held in any position against the vibrating surface with its long dimension at right angles to the direction of the vibration component to be measured. Thus, as shown, the meter is positioned to measure the amplitude of vertical vibration of the body 11. If it is desired to measure the horizontal component of vibration of body 11, the meter would be oriented through 90 degrees and held against the body preferably against a surface normal to the vibration component to be measured so as to be sure that the meter casing is subject to the vibration to be investigated.

Under these conditions the weight 38 will tend to remain stationary in space due to inertia control. This will cause the driving end of rod 37 to vibrate in phase with but at a greater amplitude than the vibratory motion imparted to pivot 36. The effect of weight 40 on the weight 38 under the conditions of vibration will be negligible since they are flexibly coupled together. However, no matter in what position the meter is held, the weight 40 will always statically balance the weight 38, thus assuring that the average position of driving rod 37 is centered under any condition. The indicating lever system has its arms driven apart to amplify and produce an indication of the amplitude of vibration as previously described. By proper design the pivot 36 can be and is preferably placed at the center of oscillation of the combined mass of weight 38 and lever 37. While this is not necessary, it will considerably reduce the wear on pivot 36. While in Fig. 6 the amplifying lever system is subject to vibration due to its mounting on the vibrating frame 35, the vibrator motion as transmitted through the pivots 19 and 26 is linear and will not tend to produce rotation of the levers about their pivots. Furthermore, the energy for this vibration is drawn from vibrating body 11 and not from the inertia controlled mass 38.

Fig. 7 represents a side view and Fig. 8 a plan view of a preferred modification of the invention where gearing is employed to amplify the vibration amplitude measurement and the meter is designed for use in a variety of positions. 44 represents a base member which may be held in the hand to press the base against a structure 45, the amplitude of vibration of which is to be measured. Likewise the base 44 may be rigidly secured to any vibrating body. The motion amplifying and indicating mechanism is mounted on a framework 46 which is resiliently supported above base 44 by flat spring supports 47. The framework 46 is made sufficiently heavy as by a thick metal plate 48 that such framework remains stationary when the base 44 is vibrated in a longitudinal direction indicated by double headed arrow 49. In Fig. 7, rigidly supported on base 44, is an upright support 50 for slidably supporting the driving rod 51. This rod is provided with a pin 52 which slides in a groove 53 of the support 50 to prevent rod 51 from turning therein. The rod projects into driving relation with the amplifying gear system. Thus it extends between gear wheels 55 and 56 where the rod 51 is provided with a pin 54 which projects between the spoke arms of said wheels near the hubs thereof.

Gear wheels 55 and 56 are coaxially mounted for independent rotation on a stationary shaft 57 and have light spiral springs 58 and 59 fastened between the wheels and the stationary shaft 57 urging said wheels in opposite rotary directions such that spokes thereof are urged against pin 54. Thus a spoke of wheel 55 rests against the right side of pin 54 and a spoke of wheel 56 rests against the left side of pin 54 as seen in Fig. 8. Now, when rod 51 is vibrated in the direction of its length, the pin 54 will alternately strike the spokes and drive the wheels in opposite directions, as indicated by the small arrows adjacent thereto in Fig. 8, against the tension of spiral springs 58 and 59. The sum of spread of the spokes acting as levers and hence the sum of the rotations of the two wheels from the positions indicated in Fig. 8 will therefore be a measure of the amplitude of vibration of rod 51 and since the spokes extend to a greater radius than the point of impact with the drive rod the measurement is amplified at the periphery of the wheels. The rotation of wheel 55 is further amplified by a gear train form of lever system indicated at 60 and the rotation of gear 56 is further amplified by a gear train form of lever system indicated at 61, which gear trains are similar and are independently rotatable with respect to each other. The amplified rotation of gear 55 is thus conveyed to a hollow shaft 62 having an indicator member 63 mounted thereon. The amplified rotation of gear 56 is conveyed to a shaft 64 extending through hollow shaft 62 to an indicating member 65 mounted coaxial and adjacent to indicator member 63. Since the two gear trains are similar the pointer members will be driven in opposite directions by similar amounts in response to vibrations of rod 51.

The indicator and scale system which I prefer to use with the apparatus of Figs. 7 and 8 is shown in Figs. 9 and 10 where it will be seen that indicator members 63 and 65 are double ended and that one end of member 63 has a scale sector 66 integral therewith and the other end has a pointer extension 67 pivoted thereto at 68. Member 65 has an integral pointer indicating on scale sector 66 and its opposite end has a pointer extension 69 pivoted thereto at 70. The two pointer extensions indicate on a scale 71. The pointer extensions 67 and 69 are made of magnetic material and are normally held in alignment with members 63 and 65 as shown in Fig. 9 by tiny permanent magnets 72 and 73 mounted on the extremities of members 63 and 65 just beyond the pivots 68 and 70. If, however, the measurement goes beyond the range of the scale 71, pointer members 67 and 69 come against stops 74 and 75 and the magnetic lock between the pointer members 67 and 69 and their permanent magnets is broken and these pointer members pivot about pivots 68 and 70 while the members 63 and 65 continue to separate as shown in Fig. 10. Thus we have a fine scale indication on scale 71 for small vibration amplitude measurements and a relatively coarse indication on scale sector 66 for larger vibration amplitude measurements. The arrangement serves also as a safety feature for preventing breaking of the pointers when the scale limit is reached. When the measurement returns within the range of scale 71, the pointer members 67 and 69 are again attracted to the condition shown in Fig. 9. For a zero measurement condition the members 63 and 65 and their extensions 67 and 69 lie parallel over one another and produce zero indications on both scales, such position being assumed by reason of springs 58 and 59 returning gear wheels 55 and 56 to the position represented in Fig. 8 against pin 54, the springs being correctly adjusted and arranged for that purpose. It will be understood that in reading scale 71 as it is calibrated that the sum of both pointer readings from zero will be taken while scale 66 is direct reading. The two scales may be calibrated in the same or different unit values.

As previously indicated, this meter may be used by holding one end of its base 44 against the vibrating member such as the member indicated at 45, Fig. 7. Since the framework 46 and parts carried thereby are heavy and resiliently mounted on the base for inertia measurement purposes, the framework 46 will take somewhat different positions with respect to base 44 depending upon whether the meter is held horizontally as indicated in full lines in Fig. 7 or is inclined as for instance with its base 44 in alignment with the dotted line 44a. If held in the latter position, the heavy framework 46 will cause some bending of resilient supports 47 in the manner indicated by dotted line 47a, Fig. 7. On the other hand, this device requires the rod 51 to be rigidly clamped to the base 44 in taking a measurement. To avoid off-center scale indicating difficulties which would otherwise result from different inclined positions of the meter mentioned above, I do not clamp rod 51 to base 44 until the holding position of the meter has been selected. In this way rod 51 slides freely through guide 50 with any change in position of framework 46 and hence the zero center relation of pin 54 with respect to gear wheels 55 and 56 and consequently the alignment of pointers 67 and 69 with the zero of scale 71 are automatically preserved as the user of the meter shifts his position or the position of the meter in preparation for taking a reading.

Ordinarily, the user will grasp the base 44 of the meter in his right hand with his thumb in the vicinity of a locking bolt 76 on guide 50 which bolt is normally retained in a non-locking position by a light spring 77. Bolt 76 comprises adjustable locking means between rod 51 and base 44. Pressing in on bolt 76 with the thumb locks rod 51 to the guide support 50 and this is done just before the user takes a reading after the drive rod has adjusted itself to the proper position and without further changing the inclination of the meter.

In taking a measurement, base 44 and rod 51 vibrate in the directions indicated by double headed arrow 49 with member 45. The heavy framework 48, however, remains relatively stationary in space due to its inertia and its resilient coupling to base 44. Hence, the rod 51 drives the wheels 55 and 56 in opposite directions separating the spokes thereof which are in contact with pin 54 by an amount proportional to the amplitude of vibration. The amplifying gear train and pointer system respond accordingly to obtain the measurement. It is important to note that the amplifying gear train does not vibrate with rod 51 and takes only enough energy from vibrating rod 51 to operate the system against the weak restoring force of springs 58 and 59 and then to hold the system to the spread of wheels 55 and 56 corresponding to the maximum vibrations of rod 51. As such vibrations reduce in amplitude the springs restore the system to a correspondingly reduced measurement indication. This meter, when carefully designed, is capable of measuring the amplitude of vibrations over a range of frequency from 10 to 5000 cycles per second and over an amplitude range from .02 inch to .0001 inch. Its total weight need not be more than two pounds and its dimensions not over 3 x 3 x 5 inches.

It will be evident that the use of a sector scale 66 on one arm 63 and the use of the other movable arm 65 as a pointer cooperating with the scale on sector 66 as shown in Figs. 9 and 10 largely removes the objection to an off-center condition of the driving rod since with such an arrangement a shift of the center of oscillation also shifts the scale so that symmetry is preserved. I may therefore use such movable sector scale indicating arrangement on the meter of Fig. 1, for example, and so make such meter usable in different inclined positions.

What I claim as new and desire to secure by Letters Patent of the United States is:

1. A vibration amplitude meter comprising a drive rod which is vibrated in proportion to the amplitude of the vibrations to be investigated, means for measuring and amplifying the vibration of said drive rod including a pair of arms pivoted on a common pivot with the drive rod inserted between them, means for lightly and resiliently biasing said arms together such that when the rod vibrates the arms are forced apart and are then struck by the drive rod only at the extremities of its oscillations whereby the arms do not follow the individual oscillations of the rod but are spread substantially in proportion to the amplitude of vibration of such rod and take little energy from the drive rod, said arms having extensions at a greater radius from the pivot than the contacting point of the drive rod for amplifying the measurement.

2. A vibration amplitude meter comprising a drive member which is vibrated in proportion to the amplitude of the vibrations to be measured, means for amplifying and measuring the amplitude of vibration of said drive member including a pair of arms pivoted on a common axis with the drive member in contacting relation between them, means for lightly and resiliently biasing said arms towards said drive member such that when said member vibrates the arms are forced apart and are then struck by the drive member only at the extremities of its oscillations whereby the arms do not follow the individual oscillations of the drive member but are spread substantially in proportion to the amplitude of vibration of such member, said arms comprising a portion of a motion amplifying system for amplifying the movement of said arms and means operated by such lever system for obtaining an amplified measurement of the amplitude of vibration of said drive member.

3. A vibration amplitude meter comprising a supporting block, an amplifying system including a pair of levers pivoted on a common axis to said block, a vibration drive rod having a part extending between said levers so as to spread the levers when the rod is vibrated, resilient means for lightly resisting such spreading of the levers, means for resiliently positioning said supporting block in measuring relation with respect to a vibrating body such that the vibrations of such body are transmitted to said drive rod, the drive rod being relatively light in weight and the supporting block relatively heavy in weight such that the rod vibrates with the vibrating body and the block remains relatively stationary and the amplifying system having such relative nonresonant inertia that its levers do not partake of individual vibrations of the drive rod but are struck thereby only at the extremities of its vibration and are spread in accordance with the amplitude of vibration of the drive rod, and means actuated by said levers for producing an amplified measurement indication of the amplitude of vibration.

4. A vibration amplitude meter comprising a double lever motion amplifying and indicating system including a pair of lever arms pivoted at a common point, a vibration drive member extending into driving relation between said arms such as to drive said arms apart when said member is vibrated, resilient means for lightly biasing said arms into contacting relation with said drive member, a supporting structure for said motion amplifying system, means for resiliently positioning said supporting structure in measuring relation with respect to a vibrating body, said supporting structure being sufficiently heavy in relation to the resiliency of said positioning means that the motion amplifying system and supporting structure is not vibrated appreciably when thus supported in such measuring relation, and means for establishing vibration transmitting contact relation between said vibrating drive member and such vibration body when said meter is positioned in measuring relation with respect to such vibrating body.

5. A vibration amplitude meter comprising a double lever motion amplifying and indicating system including spoked gear wheels pivoted on the same axis, a vibration drive member extending into driving relation between spokes of said wheels such as to drive said wheels in opposite directions when the drive member is vibrated, resilient means for lightly resisting such driving action, a supporting structure for said motion amplifying and indicating system, means for resiliently positioning said supporting structure in vibration measurement relation with respect to a vibrating body, said supporting structure having sufficient inertia in relation to the resiliency of said positioning means that it is not vibrated appreciably when thus supported in such measuring relation, and means for establishing vibration transmitting contact relation between such vibrating body and said vibration drive member when said meter is positioned in measuring relation with such vibrating body, said last mentioned means being adjustable to allow the vibration drive member to assume a symmetrical driving position with respect to the double lever amplifying system for different relative positions of said supporting structure and the vibrating body when the supporting structure is in measuring position with respect to such body.

6. In a vibration amplitude meter, means for amplifying and indicating vibration amplitudes including a pair of levers pivoted on a common axis, means for resiliently urging said levers together, means for forcing said levers apart a distance proportional to the amplitude of vibration being measured, a scale sector carried by one of said levers and a pointer carried by the other lever indicating on said scale.

7. In a vibration amplitude meter, means for amplifying and indicating vibration amplitudes including a pair of levers pivoted on a common axis, means for resiliently urging said levers together, means for spreading said levers apart a distance proportional to the amplitude of vibration being measured, said levers having indicating pointer extensions pivoted thereto, a scale on which said pointer extensions indicate for relatively small measurement spreads of said levers, stops for preventing said pointer extensions moving off-scale, and means for normally holding said pointer extensions in alignment with said levers but allowing the pointer extensions to pivot on the levers when the pointer extensions move against said stops and the levers continue to spread.

8. In a vibration amplitude meter, means for amplifying and indicating vibration amplitude measurements including a pair of levers pivoted on a common axis, means for resiliently urging said levers together, means for spreading said levers in proportion to vibration amplitude measurements, pointer extensions pivoted to one end of said levers, a scale on which said pointer extensions indicate for relatively small measurement spreads of said levers, stops for said pointer extensions at the extremities of said scale, means for normally holding said pointer extensions in alignment with their levers but allowing the pointer extensions to pivot on the levers when the pointer extensions move agains the stops and the levers continue to spread, a sector scale on the other end of one lever and a pointer on the other end of the other lever indicating on said sector scale, the sector having a length to produce indications of the measurement spread of said levers beyond that afforded by the pointer extensions and first mentioned scale.

9. A vibration amplitude meter comprising a framework adapted to be positioned against and vibrated with a vibrating body under investigation, an amplifying system including a pair of levers pivoted on a common axis on said framework, a drive rod also pivoted to said framework having one end thereof extending between arms of said levers so as to spread the levers when the rod is vibrated relative to the levers, means for lightly and resiliently resisting the spread of said levers, a weight rigidly secured on the other end of said drive rod, another weight secured to the first weight by resilient means and positioned so as to balance the lever assembly about its pivot, adjustable means for resiliently biasing said drive rod to a symmetrical driving relation between the levers while permitting the lever to vibrate about its pivot in response to vibrations imparted to said framework and means actuated by said amplifying system for producing an amplified measurement indication of the spread of said levers in terms of vibration amplitude, said first mentioned weight being sufficient to tend to remain relatively stationary when the framework is vibrated.

CHARLES D. GREENTREE.